J. A. Veit,
INVENTOR.

BY [signature]
ATTORNEY

June 27, 1944.  J. A. VEIT  2,352,577
ANTI-AIRCRAFT GUN
Filed Dec. 10, 1941  9 Sheets-Sheet 4
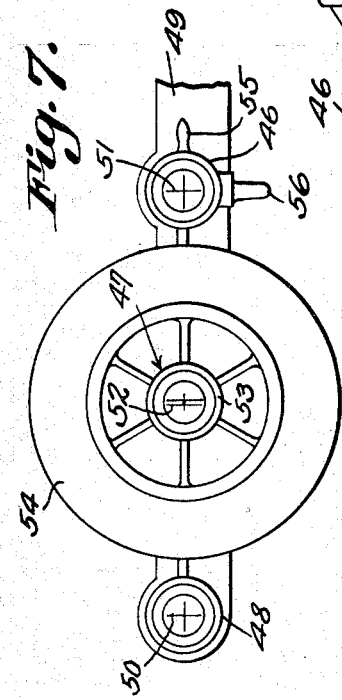
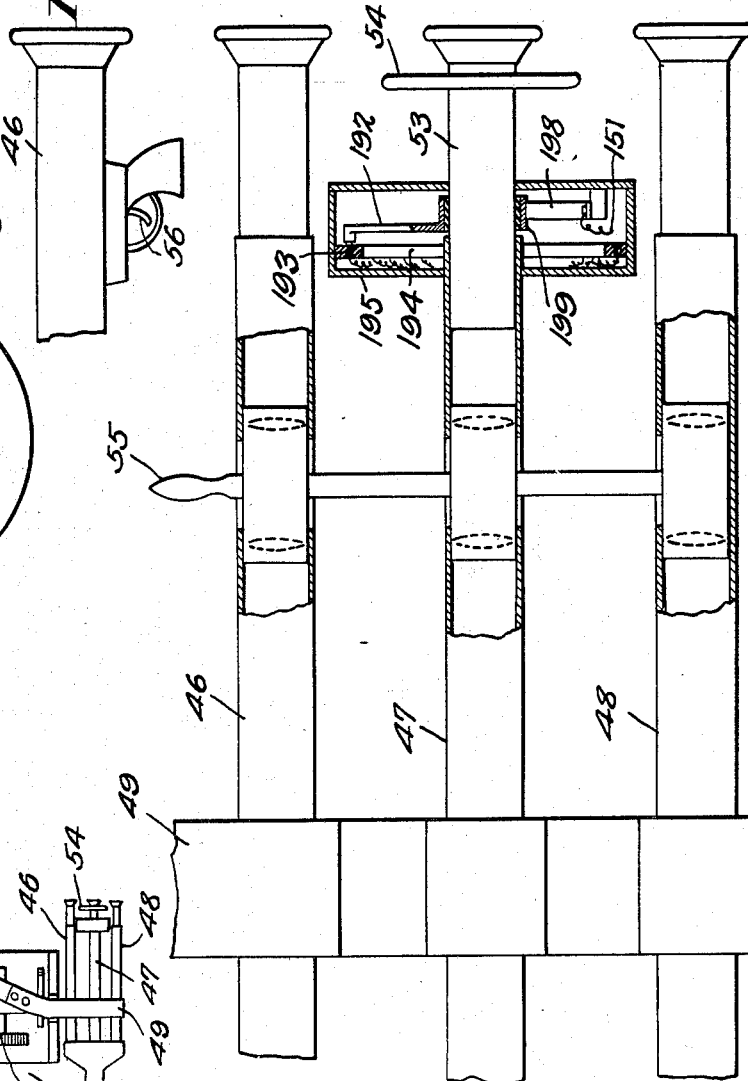
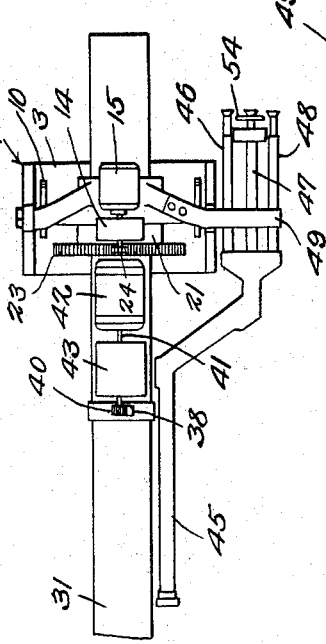
J. A. Veit
INVENTOR.
BY
ATTORNEY June 27, 1944.  J. A. VEIT  2,352,577

ANTI-AIRCRAFT GUN

Filed Dec. 10, 1941  9 Sheets-Sheet 5

J. A. Veit
INVENTOR.

BY
ATTORNEY

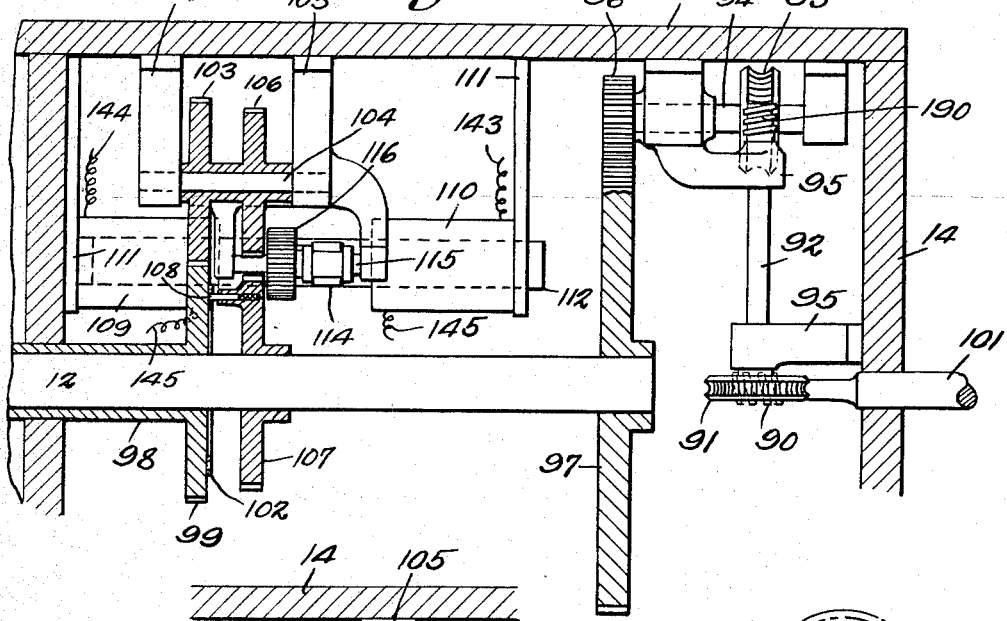
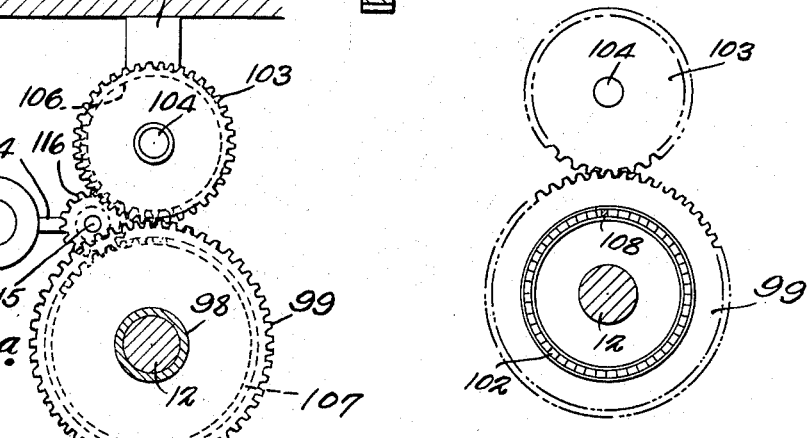
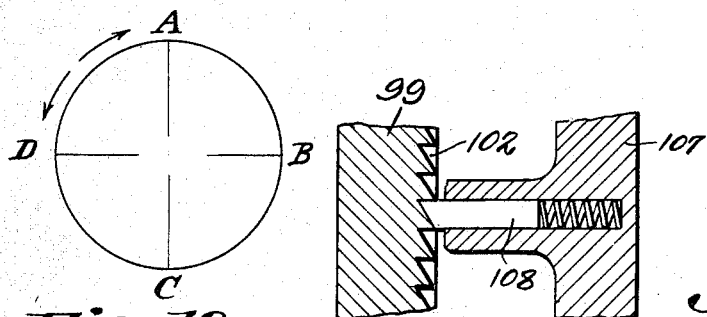
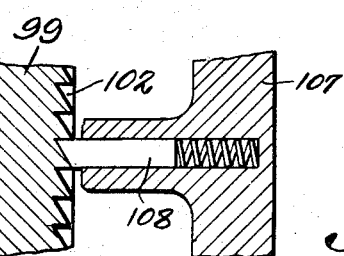

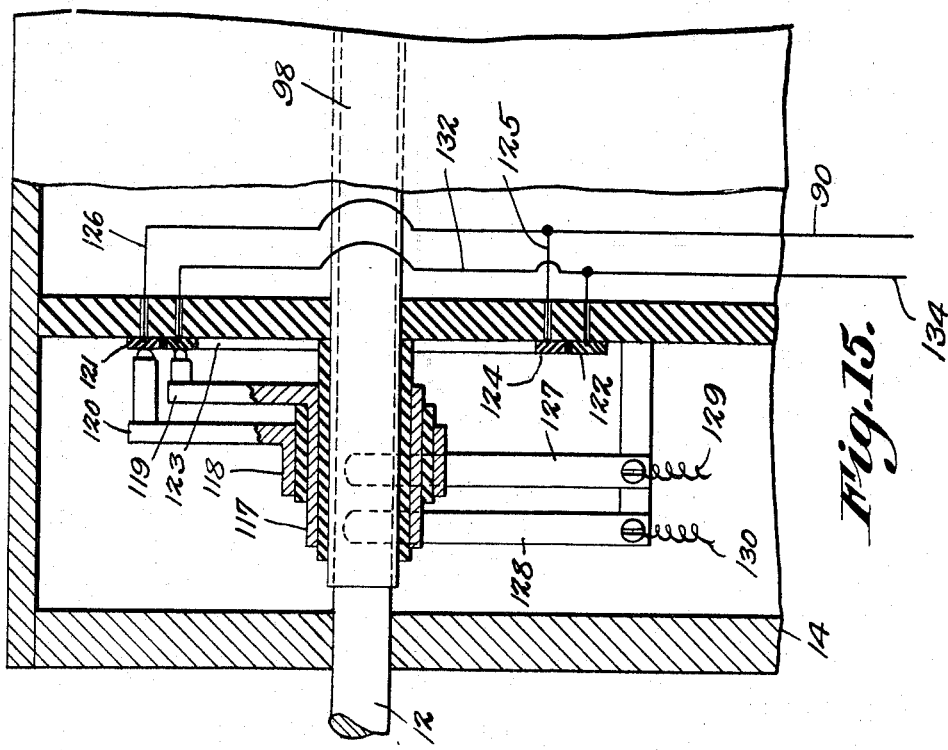
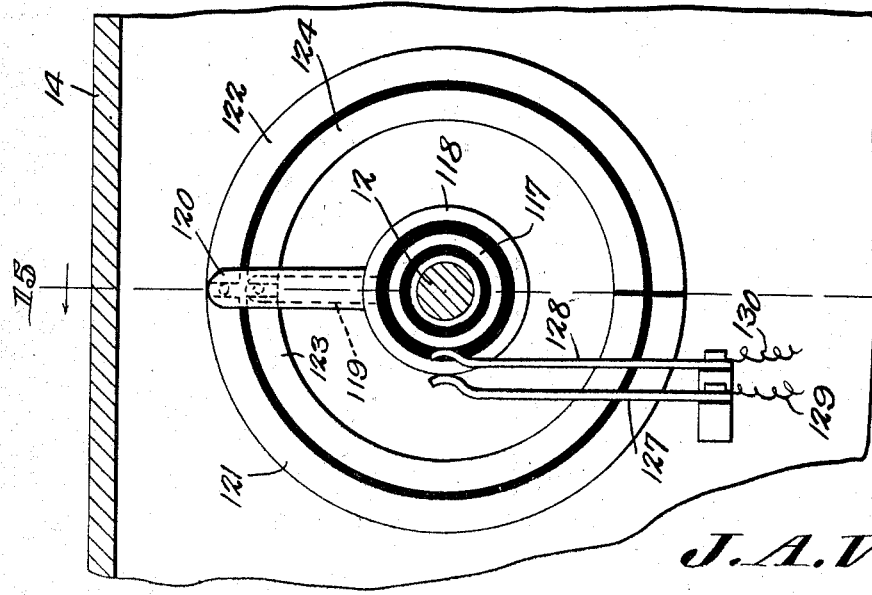

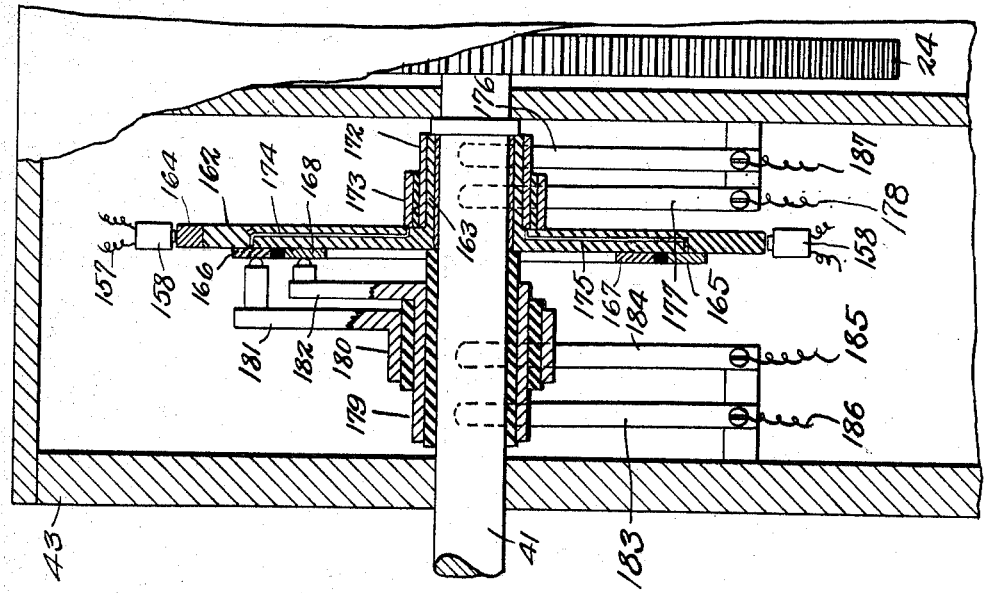
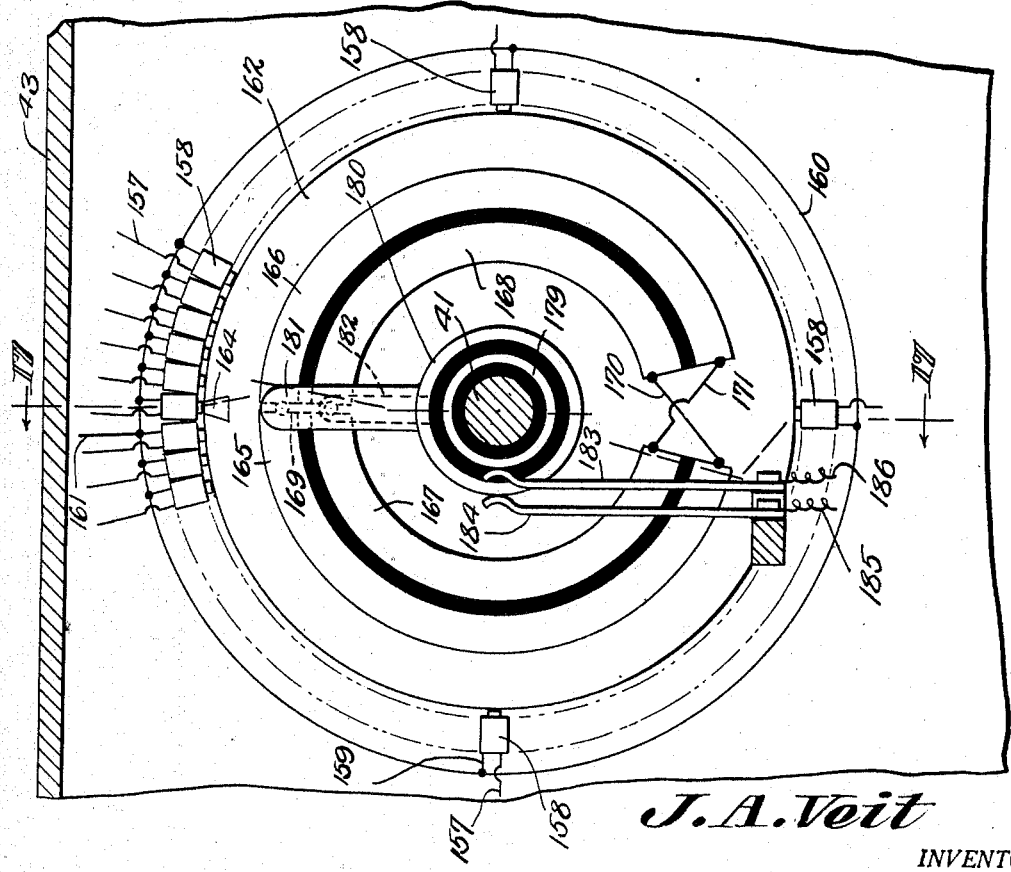

June 27, 1944. J. A. VEIT 2,352,577
ANTI-AIRCRAFT GUN
Filed Dec. 10, 1941 9 Sheets-Sheet 9

J. A. Veit INVENTOR.
BY
ATTORNEY

Patented June 27, 1944

2,352,577

UNITED STATES PATENT OFFICE 2,352,577

ANTIAIRCRAFT GUN

John Allen Veit, North Tonawanda, N. Y.

Application December 10, 1941, Serial No. 422,447

9 Claims. (Cl. 89—41)

This invention aims to provide novel means for pointing a piece of artillery at an airplane in flight, the construction being such that the piece may be made to follow the plane, regardless of the flight of the plane, considered vertically or horizontally.

The invention aims to supply novel means for mounting the artillery piece and controlling its movements at the will of operators.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 5 is a top plan;

Fig. 6 is an elevation showing one of the telescope tubes and the trigger mechanism that is carried thereby;

Fig. 7 is an elevation illustrating the telescopes and portions of the structure which carries them;

Fig. 8 is a top plan of the telescopes and attendant parts, portions being broken away;

Fig. 11 is a top plan, with parts in section, showing portions of a gear shift mechanism that is employed;

Fig. 12 is a diagrammatic elevation showing certain of the gear members;

Fig. 12A is a diagrammatic elevation disclosing further details of the structure depicted in Fig. 11;

Fig. 13 is a sectional view showing the pawl and ratchet mechanism employed in the structure delineated in Fig. 11;

Fig. 14 is an elevation showing a portion of the structure which has to do with the electrical features of the device, hereinafter set forth;

Fig. 15 is a section on the line 15—15 of Fig. 14;

Fig. 16 is an elevation showing the rotor and attendant parts;

Fig. 17 is a section on the line 17—17 of Fig. 16;

Fig. 19 is a diagrammatic view employed in explaining the operation of one of the component mechanisms.

Figure 1:
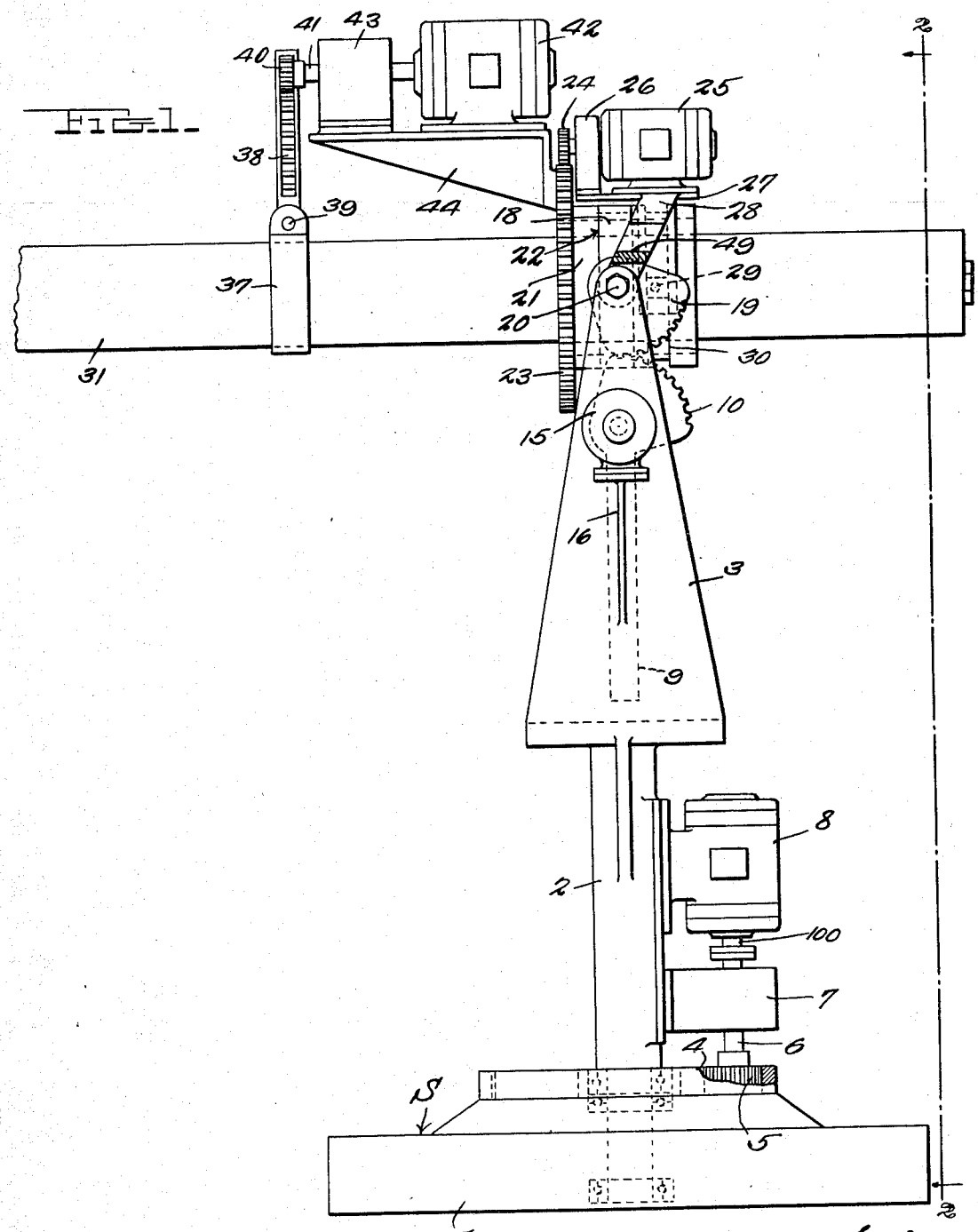
Fig. 1 shows in side elevation, a device constructed in accordance with the invention.
Figure 2:
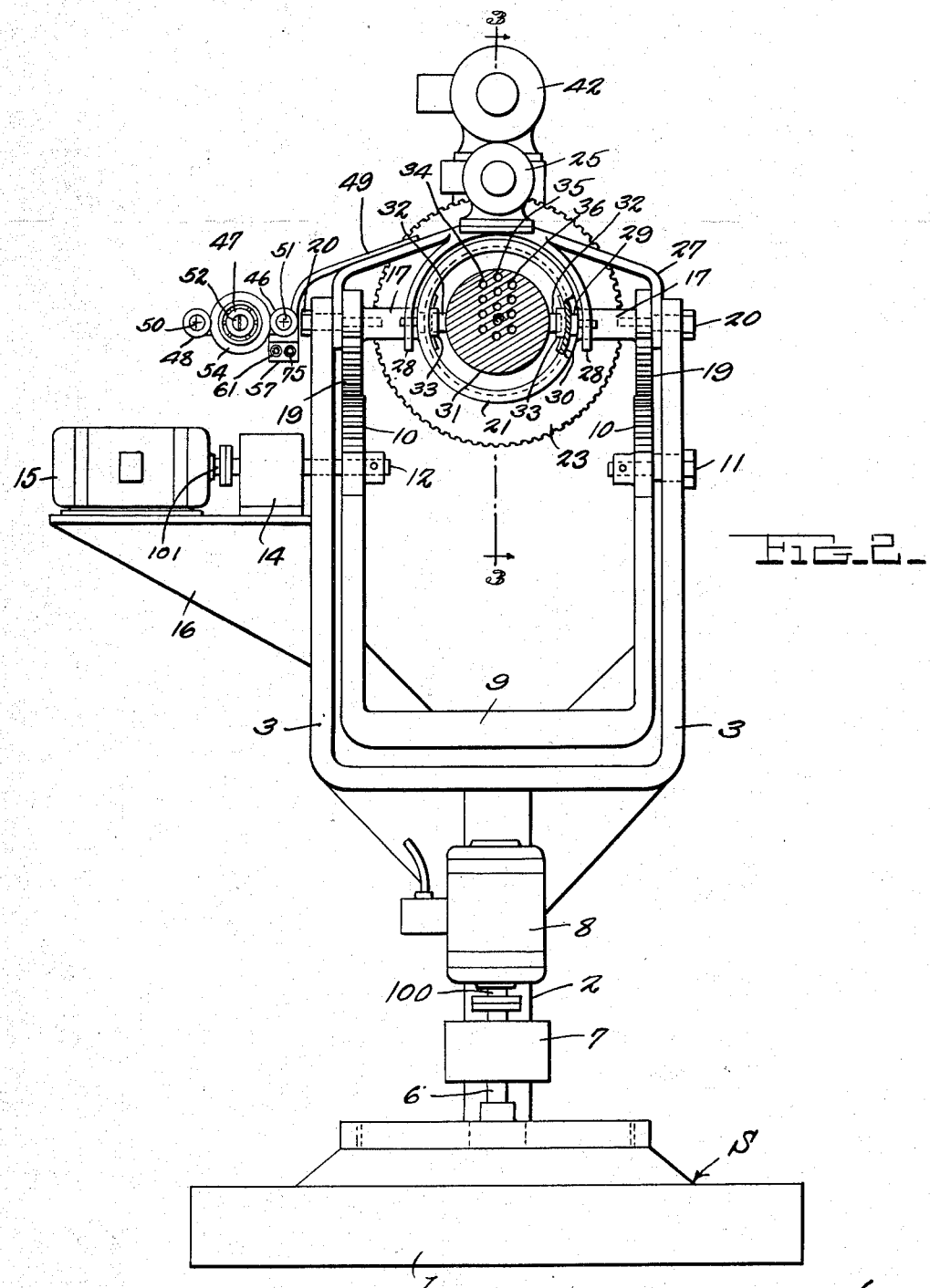
Fig. 2 is a section on the line 2—2 of Fig. 1, most parts appearing in elevation.
Figure 4:
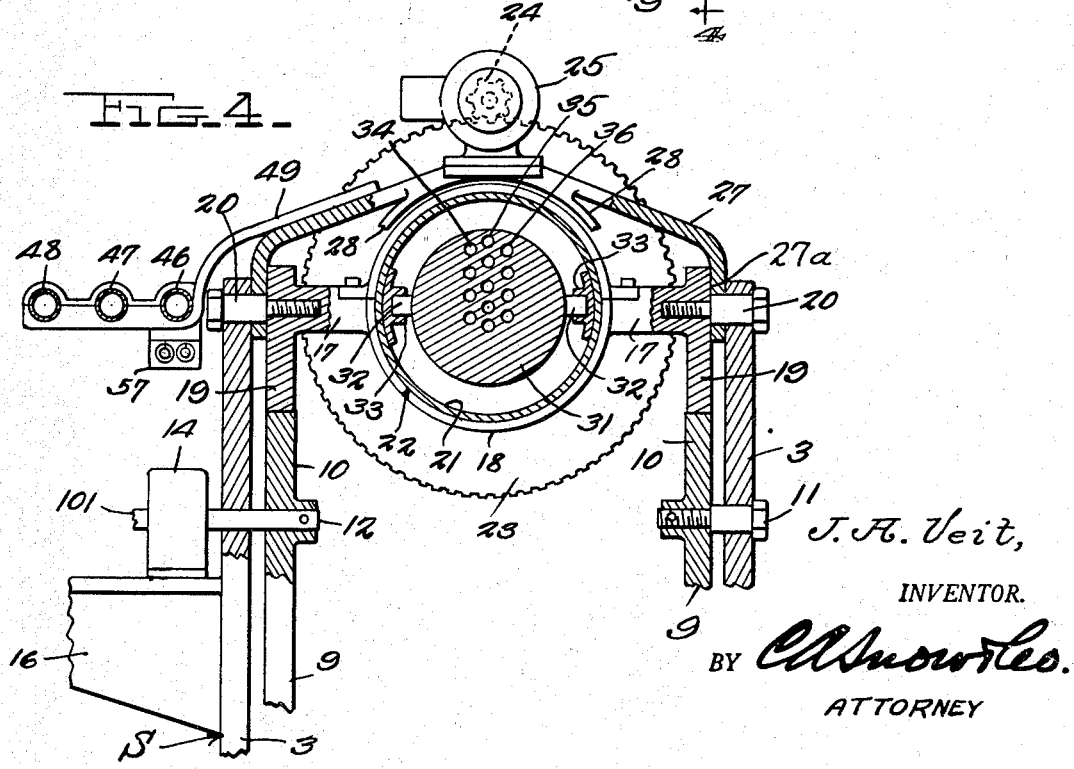
Fig. 4 is a section on the line 4—4 of Fig. 3.

In carrying out the invention, there is provided a support S (Fig. 1), including a base 1, in which the lower end of a vertical standard 2 is mounted to rotate, the standard being provided at its upper end with a fork 3, (Figs. 2 and 4). The standard 2 likewise may be referred to as a "support," since practically all working parts of the device are carried by it. A gear wheel 4 (Fig. 1) is secured to the lower portion of the standard 2 and is housed within the base 1, the gear wheel meshing with a pinion 5, secured to a vertical shaft 6, which passes into the casing of a speed reduction mechanism 7, the casing being mounted on the standard 2. The speed reduction mechanism 7 is coupled to the shaft 100 of an electrical motor 8, carried by the standard 2. The speed reduction mechanism 7 cannot be described conveniently at this stage of the specification. For the purposes of the present discussion it is sufficient to state that the motor 8 is a reversing motor, capable of imparting direct or reverse rotation to the standard 2.

Figure 3:
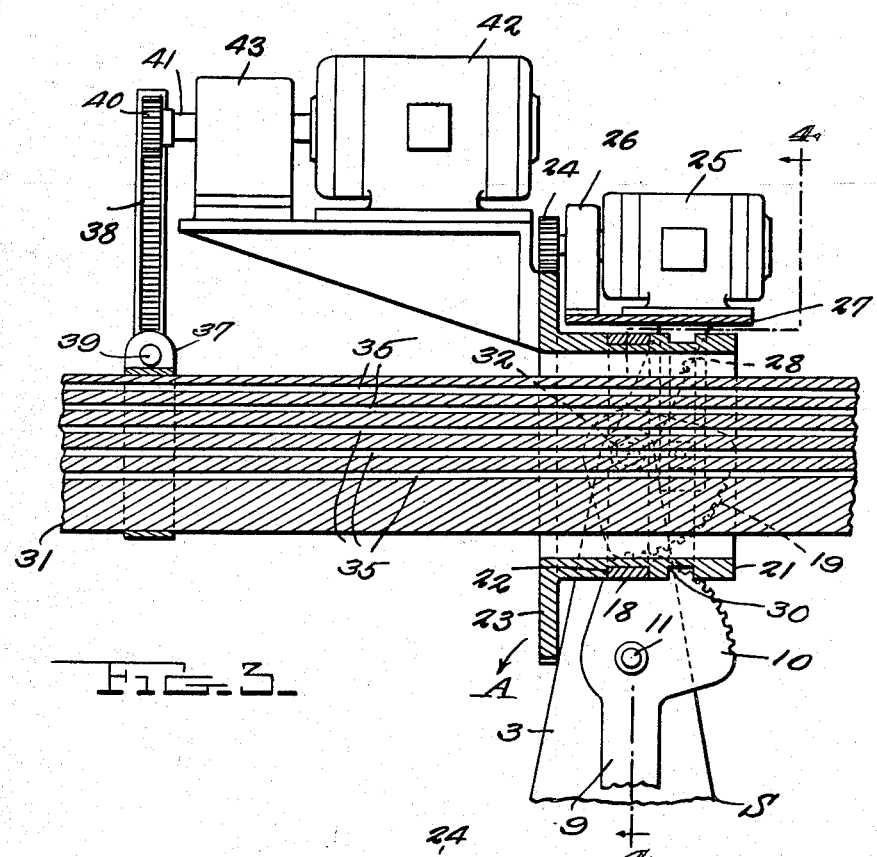
Fig. 3 is a section on the line 3—3 of Fig. 2.

A U-shaped frame 9 (Figs. 2 and 4) is disposed between the arms of the fork 3, the side members of the frame merging at their upper ends into gear segments 10 (Fig. 3). One side member of the frame 9 is mounted (Fig. 4) to swing on a pivot element 11 in one arm of the fork 3, the opposite side member of the frame being mounted to swing with the rotation of a shaft 12, mounted to rock in the adjacent arm of the fork, the shaft forming part of a speed reduction mechanism within a casing 14 (Fig. 2). The speed reduction mechanism is coupled to the shaft 101 of an electrical motor 15 (Fig. 1). A bracket 16 on one arm of the fork 3 supports the motor 15 and the speed reduction mechanism in the casing 14. The speed reduction mechanism in the casing 14 duplicates that in the casing 7 and is reserved for further discussion. The motor 15 is a reversing motor and imparts direct and reverse rotation to the shaft 12.

A horizontal shaft 17 (Figs. 2 and 4) is disposed between the arms of the fork 3, a ring 18 being interposed in the shaft. The shaft 17 is provided at its ends with gear segments 19, which mesh with the gear segments 10 on the frame 9. The shaft 17 includes detachable end sections 20, mounted to rotate in the side arms of the fork 3. A sleeve 21 (Figs. 1, 3 and 4) extends through the ring 18, and is circumferentially grooved, as at 22, to receive the ring, the sleeve thus being mounted to rotate in the ring. The shaft 17 and associated movable parts may be called a carrier.

At its forward end, the sleeve 21 is provided with a gear wheel 23 (Figs. 3 and 4), meshing with a pinion 24 on the shaft of a speed reduction mechanism 26 coupled to a reversing electrical motor 25. The motor 25 and the speed reduction mechanism 26 are carried by a bridge 27, which is fixed to the segments 19 along the surfaces 27a of Fig. 4.

In order to prevent the sleeve 21 from sagging downwardly, in the direction of the arrow A in Fig. 3,-with the shaft 17—20 of Fig. 4 as an axis of sagging movement, the bridge 27 has depending arms 28 (Fig. 2), located on opposite sides of the sleeve, and provided with heads 29, which are received in a circumferential groove 30 (Figs. 2 and 3), fashioned in the sleeve and located to the rear of the groove 22 that receives the ring 18.

A gun barrel 31 extends through the sleeve 21 and is provided intermediate its ends with trunnions 32 (Figs. 2 and 4), mounted to rock in bearings 33, secured to the inner surface of the sleeve 21. The barrel 31 has any desired number of lines of bores, designated at 34, 35 and 36, respectively, the line 35 being the intermediate line. The lines 34, 35 and 36 are disposed in parallelism, longitudinally of the axis of the barrel 31. All of the bores 34, 35 and 36 are located in a group of narrow cross-sectional area considered relatively to the cross-section of the barrel, the group being of unequal transverse dimensions, the longer transverse dimension of the group extending from a point near the longitudinal axis of the barrel to a point closely adjacent to the perimeter of the barrel.

A yoke 37 is secured to the barrel 31 (Fig. 3), in advance of the standard 2, an upwardly extended rack bar 38 being pivotally connected at 39 to the yoke. A pinion 40 meshes with the rack bar 38, and is secured to the shaft 41 of a speed reduction mechanism 43 coupled to a reversing electric motor 42. The motor 42 and the speed reduction mechanism 43 are mounted on a bracket 44, carried by the gear wheel 23 at the forward end of the sleeve 21.

A periscope 45 (Fig. 5) is disposed alongside the gun barrel 31 and furnishes duplicated images of an airplane to three telescopes 46, 47 and 48, the telescopes being carried by the bridge 27, through the instrumentality of a hanger 49, best shown in Fig. 4. The telescope or sighting device 47 may be said to be connected to the barrel 31, to participate in the movements of the barrel. Referring to Fig. 2, the telescope 48 has cross wires 50, the telescope 46 has cross wires 51, and the telescope 47 has parallel wires 52. The cross wires 52 are disposed in an eye piece 53 (Fig. 8), which is rotatable with respect to the body of the telescope 47, the eye piece having a hand wheel 54 (Fig. 7), by which it may be rotated.

An observer at the telescope 46 may focus all three of the telescopes by any simple mechanism, such as that shown at 55 in Fig. 8. The telescope 46 carries a pistol grip and trigger 56, (Fig. 6) for causing the gun barrel 31 to discharge projectiles. The firing mechanism forms no part of the present invention. It is intended that the observers at the telescopes 46, 47 and 48 shall maintain fixed positions with regard to the respective telescopes, when the standard 2 of Fig. 1, and parts carried by it, are rotated. Chairs, slings or couches for that purpose as used in observatories are known in the art, and are beyond the purview of the present disclosure.

The train of parts which operates to produce a vertical component in the pointing of the barrel 31 includes the motor 15 of Fig. 2, the speed reduction gearing in the casing 14, the intermeshing segments 10 and 19, the shaft 20—17 of Fig. 4, the ring 18, the sleeve 21, the bearings 33 and the trunnions 32. Note, however, that the barrel 31 does not have vertical swinging movement by way of the trunnions 32 and the bearings 33 in this step of the operation, independently of the sleeve 21, because the rack bar 38 of Fig. 3 is engaged with the pinion 40. The axis of vertical tilting movement is represented by the shaft 20—17.

The train of parts which produce a horizontal component in the pointing of the barrel 31 includes the motor 8 of Fig. 1, the shaft 6, the speed reduction gearing in the casing 7, the pinion 5, the gear wheel 4, the rotatable standard 2, the fork 3, and those parts shown in Fig. 2 which connect the barrel 31 to the fork, for horizontal movement. Since the pointing of the barrel 31 has both vertical and horizontal components, the piece may be aimed at an airplane, regardless of the position of the plane as to elevation or as to azimuth.

A rotation of the barrel 31 is required in order that projectiles fired from the intermediate line 35 of bores in Fig. 4 shall coincide with the line of flight of the plane, when the line of advance is horizontal, upwardly, downwardly, or at an angle of less than ninety degrees with respect to the horizontal. The rotation of the barrel 31 about its longitudinal axis serves to align the longer transverse dimension of the group of bores 34, 35 and 36, with the path of flight of the aircraft which is being attacked. The projectiles discharged from the lines 34 and 36 in Fig. 4 promote the probability of destruction, if the aiming is not so accurate that the projectiles discharged from the line 35, alone, can be relied upon.

By means of the hand wheel 54 of Fig. 7, the observer at the telescope 47 can rotate the eye piece 53, and with it, the parallel wires 52, the image of the airplane being kept between those wires, regardless of whether the line of flight is upwardly at an angle, downwardly at an angle, horizontal, or vertical. A mechanism to be described hereinafter is provided whereby when the eye piece 53 is rotated, the barrel 31 will be rotated, thus keeping the line of bores 35 (Fig. 4) between the parallel wires 52.

The train of parts hereinbefore described which produces a rotation of the barrel 31 on its axis, includes the motor 25 of Fig. 1, the speed change mechanism 26, the pinion 24, the gear wheel 23 and the sleeve 21. The sleeve 21 is mounted to rotate in the ring 18 of Fig. 4, and the ring is carried by the shaft 17—20 which is mounted in the fork 3.

Assume, by way of illustration, that the plane is flying upwardly and to the right in Fig. 4, the barrel 31 having been rotated on its longitudinal axis (Fig. 3) until the intermediate line of bores 35 in Fig. 4 is parallel to and coincident with the line of flight. It is also desirable to tilt the barrel 31 on the trunnions 32 and the bearings 33 in order that the barrel may be aimed with a "lead" on the advancing plane. The lead is in train if the plane to be attacked is in horizontal flight, but the lead will have a vertical component if the plane is moving along a path other than horizontal. The means for giving the barrel a lead, as aforesaid, includes the motor 42 of Fig. 3, the shaft 41, the speed change mechanism 43, the pinion 40, the rack bar 38 and the yoke 37.

The observer at the telescope 46 has under his control a means whereby the horizontal and vertical components in the pointing of that telescope are determined, and whereby the "lead" is governed. The observer at the telescope 47 keeps that telescope so pointed that the airplane appears between the parallel wires 52 of Fig. 2. A means next to be described is provided whereby the barrel 31 moves in consonance with the telescopes 46, 47 and 48. The observer at the telescope 48 simply is in general charge, and issues orders to the observer at the telescope 46, especially as to pressing the trigger 56 and firing the gun; and to the observer at the telescope 47, if his efforts call for supervision.

Figure 9:
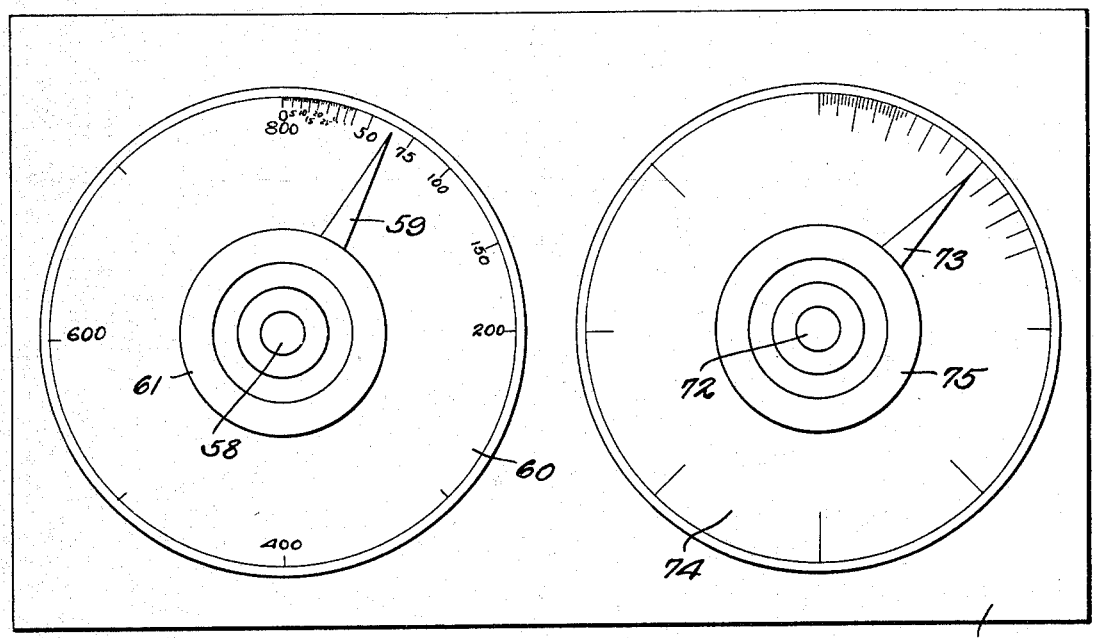
Fig. 9 is an elevation showing a casing which is located adjacent to the telescopes.
Figure 10:
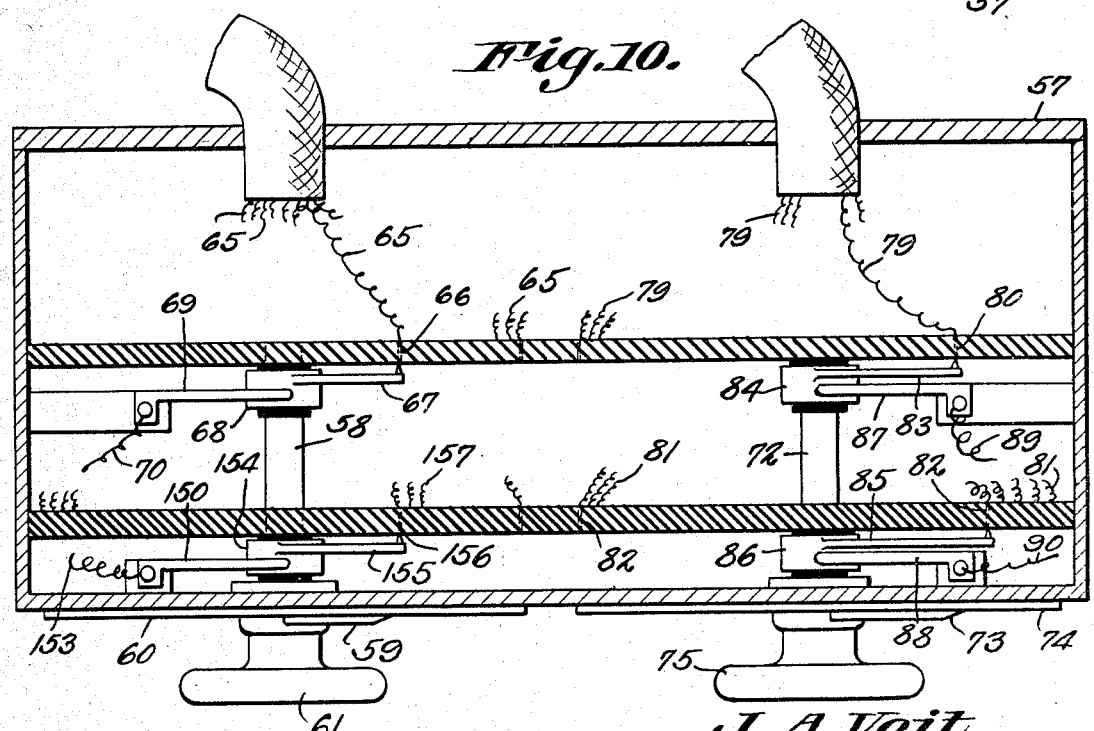
Fig. 10 is a horizontal section of the structure shown in Fig. 9.
Figure 18:
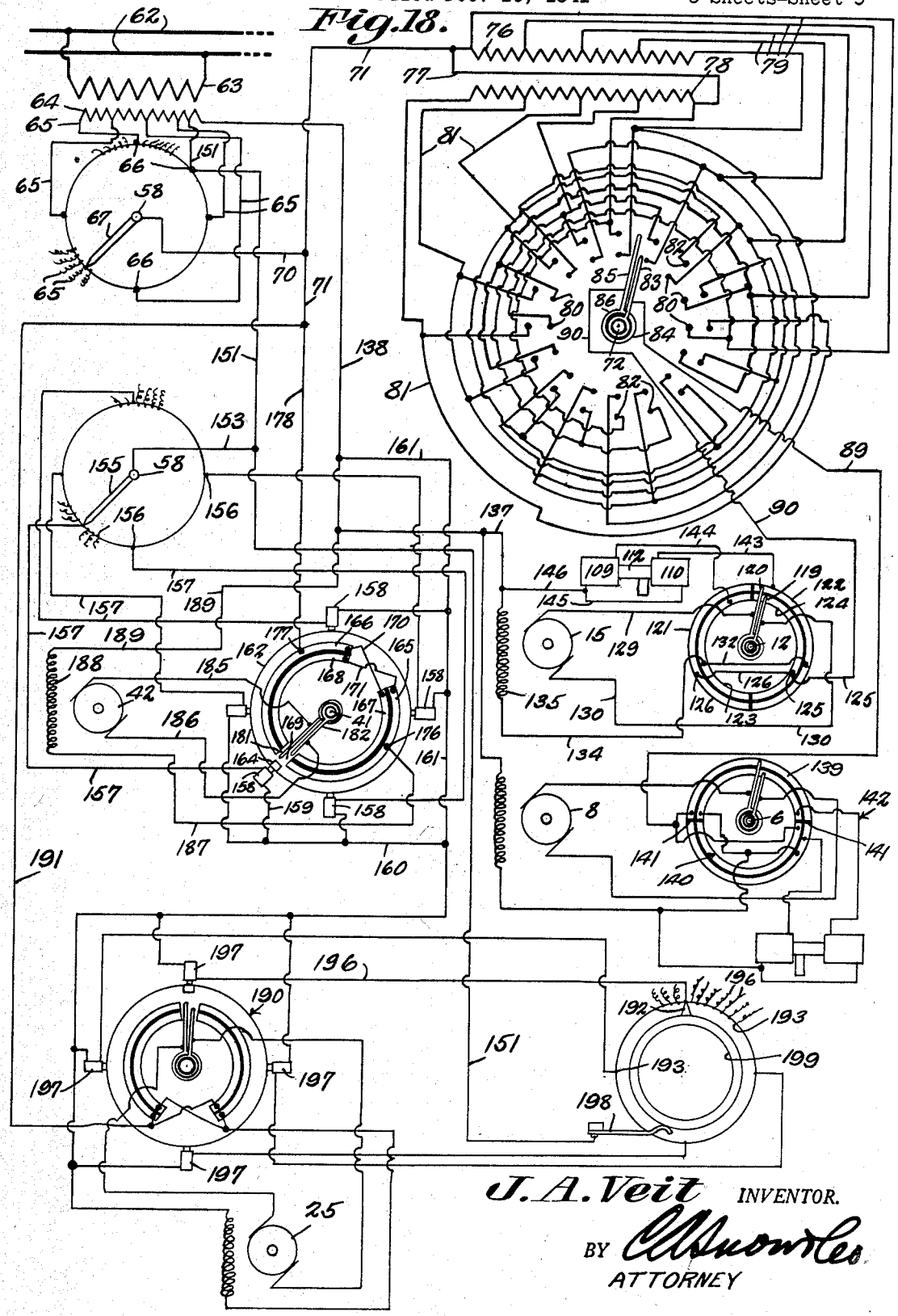
Fig. 18 is a circuit diagram.

As to the means whereby the barrel 31 is caused to move in consonance with the movements of the telescopes 46, 47 and 48, attention is directed to Figs. 9, 10 and 18. A casing 57 is mounted underneath the telescope 46, and in it is journaled a shaft 58, carrying a finger 59, adapted to cooperate with a dial 60 on the casing, and calibrated in volts, the shaft being rotated by a hand wheel 61. In Fig. 18 there are shown electric mains 62, the primary coil of a transformer appearing at 63, and the secondary at 64. Any desired number of leads 65 are taken off the secondary coil 64 and are connected to contacts 66 arranged in a circle in the casing 57. The contacts 66 are adapted to be engaged by an arm 67 carried by an insulated collar 68 on the shaft 58. A brush 69 is mounted in the casing 57 and makes electrical contact with the collar 68. A conductor 70 is joined to the brush 69 and is connected to a conductor 71. The electrical mechanism as thus far described simply regulates the voltage delivered to the conductor 71.

If the plane is flying horizontally, the vertical component is zero, and the motor 15 must be idle, the motor 8 operating at a speed determined by the horizontal speed of the plane. If the plane is flying vertically, the horizontal component is zero, and the motor 8 must be idle, the motor 15 operating at a speed determined by the vertical speed of the plane. If the plane is flying otherwise than horizontally, the motors 8 and 15 must operate at times at the same speed, for example, when the line of flight is at 45 degrees, 135 degrees, 225 degrees or 315 degrees.

The motors 8 and 15 must operate at different speeds if the line of flight is otherwise than as last-above stated, or is changing constantly. The speed at which the motors 8 and 15 operate depends on the voltage delivered to them, respectively. The current traversing the conductor 71 ultimately reaches the motors 8 and 15, but it must be regulated as to each of them. A means to that end is shown in the upper, right hand corner of Fig. 18, and its construction will next be set forth.

Reverting to Figs. 9, 10 and 18, a shaft 72 is mounted to rotate in the casing 57 and carries a finger 73, adapted to cooperate with a dial 74 on the casing, and calibrated in degrees, the shaft being rotated by a hand wheel 75. The conductor 71 is connected to one end of a resistance 76, and is connected by a conductor 77 to the opposite end of a resistance 78. Any desired number of leads 79 run from the resistance 76 to a circle of contact points 80 on the casing 57, and a corresponding number of leads 81 run from the resistance 78 to a circle of contact points 82 on the casing. The contact points 80 are adapted to be engaged by a finger 83, on a collar 84 which is carried by the shaft 72, and the contact points 82 are adapted to be engaged by a finger 85 on a collar 86 carried by the shaft. The casing 57 supports a brush 87 making contact with the collar 84, and a brush 88 making contact with the collar 86. A conductor 89 is joined to the brush 87, a conductor 90 being joined to the brush 88.

The conductor 89 furnishes current to the motor 8 of Fig. 1, which produces the lateral component, and the conductor 90 furnishes current to the motor 15 of Fig. 2, which produces the vertical component. The device shown in Figs. 9 and 10, and in the upper, right hand corner of Fig. 18, affords a means whereby the voltage supplied to the motors 8 and 15 may be altered at the will of an operator. Owing to the manner in which the leads 79 and 81 are taken off the resistances 76 and 78, respectively, together with the manner in which the fingers 85 and 83 cooperate with the contact points 82 and 80, the voltage supplied to the motor 15 rises as the voltage supplied to the motor 8 falls, and vice versa. The motors 8 and 15 operate at governed speeds, under the control of an operator at the hand wheel 75 of Figs. 2 and 10, and the horizontal and vertical components in the pointing of the gun 31 are regulated as occasion may require.

Noting diagrammatic Fig. 19, it will be understood that the gun barrel 31, responding to the motors 8 and 15, must be capable of being pointed anywhere around the circumference there represented, and it must be capable of moving in each of the two directions indicated by the arrows. The motors 8 and 15 are reversing motors, and it is clear that they must be reversed at the points A, B, C, and D, nothing more intricate than the relative values of the sine and cosine of any angle being involved. The means for reversing the motors 8 and 15 will next be described.

The construction of the speed reduction gearing for the motor 15 of Fig. 2, and located in the casing 14, is shown in Figs. 11 to 13. The shaft 101 of the motor 15 enters the casing 14 and is supplied with a worm 90, meshing with a worm wheel 91 on a shaft 92, the shaft 92 being provided with a worm 100, meshing with a worm wheel 93 on a shaft 94, the shafts being supported at 95 for rotation on the casing. The shaft 94 carries a pinion 96, meshing with a gear wheel 97 on the shaft 12 of the speed reduction gearing. The construction is such that when the motor 15 reverses its shaft 101, the shaft 12 will be reversed also, a vertical component being contributed to the pointing of the gun barrel 31.

A sleeve 98 is rotatable on the shaft 12 and carries a gear wheel 99, which has a ratchet 102, on one side. The gear wheel 99 meshes with a gear wheel 103 rotatable on a shaft 104, carried by brackets 105 on the casing 14. The gear wheel 103 is integral with a gear wheel 106, which coacts with a gear wheel 107 fixed to the shaft 12. The gear wheel 107 carries a spring-pressed pawl 108, adapted to cooperate with the ratchet 102 of the gear wheel 99. Solenoid coils 109 and 110 are mounted at 111 in the casing 14 and an armature 112 is responsive to them. The armature 112 has a lateral fork 114 received between shoulders on a shaft 115 having rotation and straight line reciprocation in depending parts of the brackets 105. A pinion 116 is secured to the shaft 115 and is adapted to be moved into and out of mesh with the gear wheels 106 and 107.

The shaft 12 may be driven directly or in reverse, in consonance with the shaft 101 of the motor 15, and the shaft 6 may be driven directly or in reverse, in consonance with the shaft 100 of the motor 8, reversals taking place, as to the shaft 6, at the points D and B of Fig. 19, and as to the shaft 12, at the points A and C, as more fully described hereinafter. By moving the pinion 116 into and out of mesh with the gear wheels 106 and 107, when the reversals take place at A, B, C and D, the sleeve 98 may be kept running in one direction, even though the direction of rotation of the shaft 12 has been reversed, due to a reversal of the motor 15 and its shaft 101. The reason why the sleeve 98 must maintain a continuous direction of rotation will be made manifest hereinafter.

Noting Fig. 15 in conjunction with Fig. 18, the sleeve 98 has insulated hubs 117 and 118 provided, respectively, with arms 119 and 120. The arm 120 traverses a circular outer track on the casing 14, and the arm 119 traverses a circular inner track on the casing. The outer track (Fig. 18) is divided vertically, to form semi-circular members 121 and 122. The inner track is similarly divided, to form semi-circular members 123 and 124. The conductor 90 is joined electrically, as at 125, to the track member 124, and at 126 to the track member 121.

The casing 14 (Fig. 15) supports a brush 127 which engages the hub 118, and a brush 128 which engages the hub 117. A conductor 129 connects the brush 127 with one side of the motor 15, and a conductor 130 connects the brush 128 with the opposite side of the motor 15. A conductor 132 connects the track member 122 with the track member 123, and from the track member 123 there leads a conductor 134, in which the field 135 of the motor 15 is interposed. The field 135 of the motor 15 is joined by a conductor 137 to a conductor 138 which is connected to the secondary 64 of the transformer.

Disregard for the moment the functioning of the mechanism shown in Figs. 11 to 13, and assume that the arms 119 and 120 are in the positions shown in Fig. 18. Then there is established a circuit which includes the conductor 90, the conductor 125, the track member 124, the arm 119, the hub 117, the brush 128, the conductor 130, the motor 15, the conductor 129, the brush 127, the hub 118, the arm 120, the track member 122, the conductor 132, the conductor 134, the field 135, the conductor 137, the conductor 138, and the secondary 64 of the transformer.

Suppose that the arm 120 engages the track member 121, the arm 119 engaging the track member 123. Then there is established a circuit comprising the conductor 90, the conductor 125, the conductor 126, the track member 121, the arm 120, the hub 118, the brush 127, the conductor 129, the motor 15, the conductor 130, the brush 128, the hub 117, the arm 119, the track member 123 and the conductor 134, and the motor 15 is reversed. The circuit is completed by the field 135, the conductor 137, the conductor 138, and the secondary 64 of the transformer.

The reversal of the motor 15, said motor being the instrumentality whereby the vertical component is introduced into the aiming of the gun 31, occurs at the points A and C of Fig. 19. The reversal of the motor 8, said motor being the instrumentality whereby the horizontal component is introduced into the aiming of the gun 31, occurs at the points B and D of Fig. 19. The casing 7 of Fig. 2 contains a mechanism differing from the mechanism enclosed in the casing 14 only in that, as shown in Fig. 18, the track members 139 and 140 are divided horizontally, as at 141, to bring about a reversal at the points D and B of Fig. 19. The electrical equipment, marked as a whole by the numeral 142, has no distinguishing characteristics which call for lengthy description, in view of what has been explained hereinbefore, in connection with the motor 15. The motor 8, however, receives current from the conductor 89 of Fig. 18, rather than from the conductor 90.

Suppose that the direction of rotation of the shaft 101 of the motor 15 were reversed, and that the arms 119 and 120, of Figs. 18 and 15 were mounted on the shaft 12, instead of on the sleeve 98. In that case, the arms 119 and 120 would simply oscillate back and forth through a small arc at one of the places where the track members 121—123 and 122—124 are separated terminally, and there would be no more than a continuous and fluttering reversal of the motor 15. It is necessary that the sleeve 98 rotate in one direction, even though the direction of rotation of the motor shaft is reversed.

A conductor 143 joins the track member 122 to the intake end of the winding of the solenoid magnet 110, and a conductor 144 joins the track member 123 to the intake end of the winding of the solenoid magnet 109. The outlet ends of the windings of the magnets 109 and 110 are joined by a conductor 145, and from the conductor 145 a conductor 146 leads to the conductor 137, and current flows by way of the conductor 138 to the secondary 64 of the transformer. Referring to Figs. 11 to 13, rotation may be imparted to the sleeve 98 by the pawl 108 of the gear wheel 107 and the ratchet 102 of the gear wheel 99, the pinion 116 being out of mesh with the gear wheel 106 and the gear wheel 107. By the energization of the appropriate magnet 109 or 110, the pinion 116 is introduced between the gear wheels 106 and 107. The sleeve 98 then continues to rotate in the same direction, even though the direction of rotation of the motor shaft 101 has been reversed, the pawl 108 clicking over the ratchet 102.

Referring to Figs. 8, 9, 10, 16, 17 and 18, the shaft 58 and parts next to be described govern the operation of the motor 42 of Fig. 1, which functions to give a lead to the gun barrel 31. From any portion of the secondary 64 of the transformer, there leads a conductor 151, which is joined to a conductor 153, connected to a brush 150 (Fig. 10) on the casing 57. The brush 150 makes contact with an insulated collar 154 on the shaft 58. The collar 154 has a finger 155, adapted to engage any of a plurality of contacts 156 on the casing 57. Of these contacts, there may be any desired number, a conductor 157 being joined to each contact.

Noting Figs. 16 and 17, the conductors 157 are joined to electro-magnets 158, fixed in a circle in the casing of the speed reduction mechanism 43, the electro-magnets forming part of a magnetic switch. The electro-magnets 158 are severally joined by conductors 159 to a conductor 160, joined to a conductor 161, which is connected to the conductor 138.

The circuit for each electro-magnet 158 includes the conductor 151, the conductor 153, the brush 150 (Fig. 10), the hub 154, the finger 155, the contact 156, the conductor 157, the magnet 158, the conductor 159, the conductor 160, the conductor 161, the conductor 138, and the secondary 64 of the transformer.

Considering Figs. 16 and 17, a switch mechanism is provided and includes a rotor 162 having a hub 163 rotatable on the shaft 41 (Fig. 1) of the speed reduction gearing 43 that is assembled with the motor 42. The rotor 162 has a peripheral armature 164, responsive to the particular electro-magnet 158 that happens to be energized. The rotor 162 has an outer track, made up of semicircular members 165 and 166; and an inner track, made up of semicircular members 167 and 168. The ends of the track members 165 and 167 are separated from the ends of the track members 166—168, to create a dead area 169. Opposite the dead area 169, the track member 168 is joined to the track member 165 by an electrical connection 170, the track member 166 being joined to the track member 167 by an electrical connection 171.

A sleeve 172, (Figure 17) is secured to the hub 163 of the rotor 162 and is circumscribed by an insulated sleeve 173. The sleeve 173 is connected electrically to the track member 166, as shown at 174, the sleeve 172 being connected electrically to the track member 165, as shown at 175. Fixed brushes are carried by the casing 43, the brush 176 cooperating with the sleeve 172, and the brush 177 cooperating with the sleeve 173. A conductor 178 is connected to the brush 177 and is joined to the conductor 71. A sleeve 179 is secured to but insulated from the shaft 41. A sleeve 180 is secured to but insulated from the sleeve 179.

The sleeve 180 has an arm 181, adapted to engage electrically with the track members 165 and 166, one at a time. The sleeve 179 has an arm 182, adapted to engage the track members 167 and 168, one at a time. The casing 43 carries a brush 183, engaging the sleeve 179, and a brush 184 engaging the sleeve 180. A conductor 185 joins the brush 184 to one side of the motor 42. A conductor 186 extends from the opposite side of the motor 42 and is joined to the brush 183. A conductor 187 joins the brush 176 to the field 188 of the motor 42. A conductor 189 joins the field 188 to the common return 138.

Suppose that, by an appropriate rotation of the hand wheel 61 and the shaft 58 of Fig. 10, the appropriate electrode magnet 158 is energized, through the magnet circuit hereinbefore traced out. The selected electrode magnet 158 attracts the armature 164 on the rotor 162, and the rotor makes a partial rotation on the shaft 41, until the armature 164 reaches the selected electrode magnet 158. As soon as the rotor 162 starts to rotate, counterclockwise in Fig. 18, the finger 181 comes into contact with the track member 166, and the finger 182 comes into contact with the track member 168.

Then there is established a circuit comprising the conductor 71, the conductor 178, the brush 177, the sleeve 173, the connection 174, the track member 166, the finger 181, the sleeve 180, the brush 184, the conductor 185, the motor 42, the conductor 186, the brush 183, the sleeve 179, the finger 182, the track member 168, the conductor 171, the track member 165, the connection brush 175, the sleeve 172, the conductor 187, the field 188, the conductor 189, and the return conductor 138. Under such circumstances, the motor 42 has direct rotation.

By an appropriate rotation of the hand wheel 61 and the shaft 58 of Fig. 10, the rotor 162 is caused to rotate clockwise in Fig. 18. The finger 181 is on the track member 165, and the finger 182 is on the track member 167. Then there is established a circuit comprising the conductor 71, the conductor 178, the brush 177, the sleeve 173, the connection 174, the track member 166, the conductor 170, the track member 167, the finger 182, the sleeve 179, the brush 183, the conductor 186, the motor 42, the conductor 185, the brush 184, the sleeve 180, the finger 181, the track 165, the conductor 175, the sleeve 172, the brush 176, the conductor 187, the field 188, the conductors 189 and 138. The motor 42 then is operating in reverse.

From the foregoing it will be noted that the operator has under his control, the means whereby the motor 42 of Fig. 1 may be operated directly or in reverse to impart swinging movement to the gun 31, and to give the gun a lead on the flying airplane.

From what has been stated up to this point, it appears that the observer at the telescope 46 has several duties to perform. He focuses all of the telescopes 46, 47 and 48. He controls the motors 8 and 15, which produce the horizontal and vertical components in the pointing of the gun barrel, he controls the motor 42 which gives the lead and he presses the trigger 56 of Fig. 6, to fire the gun. Should these duties prove too onerous, the trigger 56 might be placed on one of the other telescopes, for example the telescope 48. As to the focussing, the structure shown at 55 is such that the focussing might be done elsewhere than at the telescope 46. It is the duty of the observer at the telescope 47 to rotate the eye piece 53 of Fig. 8, by means of the hand wheel 54 of Fig. 7, to keep the wires 52 parallel to the line of flight of the plane, with the image of the plane between them, the gun barrel 31 being rotated axially, so that the line 35 of bores in Fig. 4 follows the line of flight of the plane, the particular bore of the line 35 that is in the axis of the barrel being directly on the airplane. The function referred to results from the operation of the motor 25, as hereinafter set forth. The means for accomplishing that result will now be set forth in few words, since the component mechanisms are substantial duplicates of others hereinbefore described.

Referring to Fig. 18, there is provided at 190 a magnetic switch like that shown in Figs. 16 and 17, and contained within the gear casing 26 of Fig. 3. The intake conductor for the motor 25 is shown at 191 and is connected to the conductor 71. As to the controlling connection between the eye piece 53 of the sighting device 47 and the mechanism for rotating the barrel 31, the rotatable eye piece part 53 of Fig. 8 carries a finger 192 traversing contacts 193 mounted in a ring 194 in a casing 195 secured to the fixed portion of the telescope 47. Conductors 196 lead to the electro-magnets 197 of the switch 190, those electro-magnets corresponding to the electro-magnets 158 of Figs. 16, 17 and 18. The conductor 151 leads to a brush 198, making contact with a ring 199, carrying the finger 192. By rotating the eye piece 53 of the telescope 47 (Fig. 8), corresponding movement by the motor 25 is brought about. To trace out the circuits would be merely a restatement of the operation of the magnet switch already described, and a retracing of the circuits seems unnecessary.

By way of résumé, by rotating the hand wheels 61 and 75 of Figs. 2 and 10, the operator at the telescope 46 of Fig. 8 regulates the voltage supplied to the motors 8 and 15 and apportions the current between them, the motors operating at various speeds relatively to each other, and horizontal and vertical components being determined in the pointing of the gun barrel 31. He also determines the gun lead, since the motor 42 is under his control. The operator at the telescope 47 turns the hand wheel 54 and keeps the wires 52 of the telescope 47 and the three rows of bores 34, 35 and 36 in the gun barrel 31 parallel to the line of flight of the airplane. The operator at the telescope 48 simply exercises supervisory authority.

The device is of maximum efficiency when the longitudinal axis of the barrel 31 is at right angles to the longitudinal axis of the aircraft which is under attack, but the device is not without utility as the angle departs from ninety degrees.

Having thus described the invention, what is claimed is:

1. In a device for pointing a gun at an aircraft in flight, a gun barrel having bores, all of which are located in a group of narrow cross-sectional area considered relatively to the cross-section of the barrel, the group being of unequal transverse dimensions, the longer transverse dimension of the group extending from a point near the longitudinal axis of the barrel to a point closely adjacent to the perimeter of the barrel, means for mounting the barrel for vertical swinging movement and for horizontal swinging movement, each at the will of an operator, and for rotation on its longitudinal axis, to align the longer transverse dimension of the group with the path of flight of the aircraft, and mechanism under the control of an operator for rotating the barrel on its longitudinal axis.

2. In a device for pointing a gun at an aircraft in flight, a support, means for mounting the support for rotation about a substantially vertical axis, a gun barrel having bores, all of which are located in a group of narrow cross-sectional area considered relatively to the cross-section of the barrel, the group being of unequal transverse dimensions, the longer transverse dimension of the group extending from a point near the longitudinal axis of the barrel to a point closely adjacent to the perimeter of the barrel, and means for mounting the barrel on the support for substantially vertical swinging movement, for rotation on its longitudinal axis, to align the longer transverse axis of the group with the path of flight of the aircraft, and for swinging movement along the line of flight of the aircraft, to afford a lead for each position to which the barrel may have been rotated on its longitudinal axis.

3. In a device for pointing a gun at an aircraft in flight, a gun barrel having bores, all of which are located in a group of narrow cross-sectional area considered relatively to the cross-section of the barrel, the group being of unequal transverse dimensions, the longer transverse dimension of the group extending from a point near the longitudinal axis of the barrel to a point closely adjacent to the perimeter of the barrel, means for mounting the barrel for horizontal and vertical swinging movements and for rotation on its longitudinal axis, a sighting device connected to the barrel, to participate in the movements of the barrel, and including a rotatable part, mechanism for rotating the barrel on its longitudinal axis, to align the longer transverse dimension of the group with the path of flight of the aircraft, and a controlling connection operatively connected to the rotatable part of the sighting device and to said mechanism.

4. In a device for pointing a gun at an airplane in flight, a support, means for mounting the support for rotation about a substantially vertical axis, a gun barrel having bores, all of which are located in a group of narrow cross-sectional area considered relatively to the cross-section of the barrel, the group being of unequal transverse dimensions, the longer transverse dimension of the group extending from a point near the longitudinal axis of the barrel to a point closely adjacent to the perimeter of the barrel, means for mounting the barrel on the support for substantially vertical swinging movement, for rotation on its longitudinal axis, to align the longer transverse dimension of the group with the path of flight of the aircraft, and for swinging movement along the line of flight of the aircraft, to afford a lead for each position to which the barrel may have been rotated on its longitudinal axis, a sighting device operatively connected to the barrel, to participate in the movements of the barrel, mechanism for imparting rotation to the support, mechanism for imparting said substantially vertical swinging movement to the barrel, and a control for each of said mechanisms, the controls being located conveniently with respect to an observer at the sighting device.

5. A device for pointing a gun at an aircraft in flight, constructed as set forth in claim 4, in combination with a second sighting device operatively connected to the barrel, to participate in the movements of the barrel, the second sighting device including a rotatable part, mechanism for rotating the barrel on its longitudinal axis, and a controlling connection operatively connected to the last-specified mechanism and to the rotatable part of the second sighting device.

6. In a device for pointing a gun at an aircraft in flight, a support, means for mounting the support for rotation about a substantially vertical axis, a carrier, a barrel projecting from the carrier and having bores, all of which are located in a group of narrow cross-sectional area considered relatively to the cross-section of the barrel, the group being of unequal transverse dimensions, the longer transverse dimension of the group extending from a point near the longitudinal axis of the barrel to a point closely adjacent to the perimeter of the barrel, means for pivoting the carrier to the support, to permit vertical swinging movement of the barrel, a member mounted on the carrier for rotation in a plane transverse to the longitudinal axis of the barrel, to align the longer transverse dimension of the group with the path of flight of the aircraft, means for pivoting the barrel to said member for swinging movement along the line of flight of the aircraft, to afford a lead for each position to which the barrel may have been rotated, and means for rotating said member.

7. A device for pointing a gun at an aircraft in flight, constructed as set forth in claim 6, and wherein the last-specified means comprises a motor supported from the carrier, and a driving connection between the motor and said member.

8. A device for pointing a gun at an aircraft in flight, constructed as set forth in claim 6, in combination with mechanism for swinging the barrel along said line of flight of the aircraft, said mechanism comprising a motor supported from the carrier and having a shaft, a pinion connected to rotate with the shaft, and a rack engaged with the pinion and pivoted to the barrel.

9. In a device for pointing a gun at an aircraft in flight, a gun barrel having bores, all of which are located in a group of narrow cross-sectional area considered relatively to the cross-section of the barrel, the group being of unequal transverse dimensions, the longer transverse dimension of the group extending from a point near the longitudinal axis of the barrel to a point closely adjacent to the perimeter of the barrel, a carrier mounted for horizontal and for vertical swinging movements, a member mounting the barrel on the carrier for rotation in a plane transverse to the longitudinal axis of the barrel, to align the longer transverse dimension of the group with the path of flight of the aircraft, and means for rotating the barrel about its longitudinal axis.

JOHN ALLEN VEIT.